US010050558B2

(12) United States Patent
Ito et al.

(10) Patent No.: US 10,050,558 B2
(45) Date of Patent: Aug. 14, 2018

(54) ALTERNATING CURRENT (AC) INVERTER AND METHOD OF CONTROLLING THE SAME

(71) Applicant: TOYOTA INDUSTRIES ELECTRIC SYSTEMS NORTH AMERICA, INC., Novi, MI (US)

(72) Inventors: Takabumi Ito, Novi, MI (US); Sadanori Suzuki, Novi, MI (US)

(73) Assignee: TOYOTA INDUSTRIES ELECTRIC SYSTEMS NORTH AMERICA, INC., Novi, MI (US)

( * ) Notice: Subject to any disclaimer, the term of this patent is extended or adjusted under 35 U.S.C. 154(b) by 0 days.

(21) Appl. No.: 15/180,157

(22) Filed: Jun. 13, 2016

(65) Prior Publication Data

US 2017/0358921 A1 Dec. 14, 2017

(51) Int. Cl.
*H02M 7/53* (2006.01)
*H02M 7/537* (2006.01)
*H02H 7/122* (2006.01)

(52) U.S. Cl.
CPC .......... *H02M 7/537* (2013.01); *H02H 7/1222* (2013.01)

(58) Field of Classification Search
CPC .. H02H 1/1222; H02M 7/537; H01M 16/003; H02J 2001/004; H02J 3/383; H02J 3/386; H02J 3/387; H02S 10/10; Y02E 10/563; Y02E 10/763; B60L 11/1811; G07C 5/0816

See application file for complete search history.

(56) References Cited

U.S. PATENT DOCUMENTS

| | | | | |
|---|---|---|---|---|
| 7,800,247 B2* | 9/2010 | Chang | ....................... | H02J 3/32 307/44 |
| 9,369,062 B2* | 6/2016 | Wachenfeld | ............ | H02M 7/48 |
| 2007/0177338 A1* | 8/2007 | Nishi | ....................... | H02M 7/48 361/641 |
| 2012/0139435 A1* | 6/2012 | Storm | ................. | H02M 1/4225 315/224 |
| 2013/0045626 A1* | 2/2013 | Soneda | ................... | G01R 33/07 439/544 |
| 2014/0001854 A1* | 1/2014 | Motegi | ............... | B60L 11/1814 307/38 |
| 2014/0159491 A1* | 6/2014 | Kusunose | ............... | H02J 3/383 307/52 |
| 2014/0292085 A1* | 10/2014 | Yoscovich | .............. | H02J 3/383 307/63 |

(Continued)

*Primary Examiner* — Fred E Finch, III
*Assistant Examiner* — Demetries A Gibson
(74) *Attorney, Agent, or Firm* — Sughrue Mion, PLLC

(57) ABSTRACT

An alternating current (AC) inverter includes a converter circuit configured to convert a direct current (DC) voltage to an AC voltage, and output terminals, the converter circuit being configured to output the AC voltage to the output terminals. The AC inverter further includes a signal terminal configured to receive a signal from outside of the AC inverter, and a control circuit configured to detect an abnormality related to the AC inverter, control the converter circuit to stop conversion of the DC voltage to the AC voltage in response to detection of the abnormality, and control the converter circuit to resume conversion of DC voltage to the AC voltage in response to reception of the signal on the signal terminal.

6 Claims, 3 Drawing Sheets

(56) References Cited

U.S. PATENT DOCUMENTS

2015/0244252 A1* 8/2015 Chen ................. H02M 1/32
                                                363/55
2016/0126742 A1* 5/2016 Ayai ................. H02J 3/383
                                                307/82
2016/0294309 A1* 10/2016 Sakai ................ B60L 15/12

* cited by examiner

ALTERNATING CURRENT (AC) INVERTER AND METHOD OF CONTROLLING THE SAME

BACKGROUND

1. Field

Apparatuses and methods consistent with exemplary embodiments relate to an alternating current (AC) inverter and a method of operating the same.

2. Description of Related Art

An alternating current (AC) inverter is an electronic device that changes direct current (DC) from, e.g., a battery, to AC to be used to power other electronic devices. AC inverters have been adapted to vehicles to enable passengers to use electronic devices that have not been previously-used in vehicles, e.g., a battery charger of a smartphone or personal computer (PC), a liquid-crystal-display (LCD) television, a video game console, and a power tool.

However, users of AC inverters in vehicles may experience various difficulties. For example, when an AC inverter stops operating due to detection of an abnormality related to the AC inverter, a user may have to reset the AC inverter by inconveniently stopping and restarting a vehicle. In another example, when the AC inverter stops operating due to a detection of an abnormality related to the AC inverter, the user may have to inconveniently stop the vehicle, and leave the seat to pull a plug of an electronic device from an outlet in a remote area of the vehicle, like a deck of a pickup truck or a cargo area of a minivan, to protect the electronic device or to prevent the electronic device from running automatically when the user restarts the vehicle.

SUMMARY

Exemplary embodiments provide an alternating current (AC) inverter and a method of controlling the same.

According to an aspect of an exemplary embodiment, there is provided an AC inverter including a converter circuit configured to convert a direct current (DC) voltage to an AC voltage, and output terminals, the converter circuit being configured to output the AC voltage to the output terminals. The AC inverter further includes a signal terminal configured to receive a signal from outside of the AC inverter, and a control circuit configured to detect an abnormality related to the AC inverter, control the converter circuit to stop conversion of the DC voltage to the AC voltage in response to detection of the abnormality, and control the converter circuit to resume conversion of DC voltage to the AC voltage in response to reception of the signal on the signal terminal.

The signal terminal may be one among a terminal of controller area network communication, a terminal of local interconnect network communication, and a terminal for a high/low signal.

The signal may be generated in response to connection and disconnection of the output terminals to a load.

The control circuit may be further configured to detect, based on the signal, that the output terminals are disconnected from the load and are reconnected to the load, and control the converter circuit to resume conversion of DC voltage to the AC voltage in response to detection that the output terminals are disconnected from the load and terminals are reconnected to the load.

The control circuit may be further configured to detect the abnormality based on a performance of at least one among an input overvoltage protection function, an output overcurrent protection function, an output short-circuit protection function, and an overheat protection function.

The control circuit may be further configured to detect that the DC voltage is less than an operation range, control the converter circuit to stop conversion of the DC voltage to the AC voltage in response to detection that the DC voltage is less than the operation range, detect that the DC voltage is in the operation range, and control the converter circuit to resume conversion of DC voltage to the AC voltage in response to detection that the DC voltage is in the operation range.

According to an aspect of another exemplary embodiment, there is provided an AC inverter including a converter circuit configured to convert a DC voltage to an AC voltage, first output terminals, the converter circuit being configured to output the AC voltage to the first output terminals, and second output terminals, the converter circuit being configured to output the AC voltage to the second output terminals. The AC inverter further includes a control circuit configured to receive a first signal and a second signal, control the converter circuit to output the AC voltage to the first output terminals in response to reception of the first signal, and control the converter circuit to output the AC voltage to the first output terminals and the second output terminals in response to reception of the first signal and the second signal.

The AC inverter may further include a signal terminal configured to receive the first signal and the second signal from outside of the AC inverter, the control circuit may be further configured to receive the first signal and the second signal through the signal terminal, and the signal terminal may be one among a terminal of controller area network communication and a terminal of local interconnect network communication.

The AC inverter may further include a first signal terminal configured to receive the first signal from outside of the AC inverter, and a second terminal configured to receive the second signal from outside of the AC inverter, the control circuit may be further configured to receive the first signal and the second signal through the first signal terminal and the second signal terminal, respectively, the first signal terminal may be one among a terminal of controller area network (CAN) communication, a terminal of local interconnect network (LIN) communication, and a terminal for a high/low signal, and the second signal terminal may be another one among a terminal of CAN communication, a terminal of LIN communication, and a terminal for a high/low signal.

The AC inverter may further include output relays configured to receive the AC voltage from the respective first output terminals, and the control circuit may be further configured to control the output relays to be closed to transmit the AC voltage to the respective second output terminals in response to reception of the first signal and the second signal.

The second signal may be generated based on an open/closed status of an external switch.

The control circuit may be further configured to detect an abnormality related to the AC inverter, control the converter circuit to stop conversion of the DC voltage to the AC voltage in response to detection of the abnormality, and control the converter circuit to resume conversion of DC voltage to the AC voltage in response to reception of the first signal and the second signal.

The first signal may be generated in response to connection and disconnection of the first terminals to a load, and the second signal may be generated in response to connection and disconnection of the second terminals to another load.

The control circuit may be further configured to detect, based on the first signal, that the first output terminals are disconnected from the load and are reconnected to the load, detect, based on the second signal, that the second output terminals are disconnected from the other load and are reconnected to the other load, and control the converter circuit to resume conversion of DC voltage to the AC voltage in response to detection that the first output terminals are disconnected from the load and are reconnected to the load and detection that the second output terminals are disconnected from the other load and are reconnected to the other load.

The control circuit may be further configured to detect the abnormality based on a performance of at least one among an input overvoltage protection function, an output overcurrent protection function, an output short-circuit protection function, and an overheat protection function.

The control circuit may be further configured to detect that the DC voltage is less than an operation range, control the converter circuit to stop conversion of the DC voltage to the AC voltage in response to detection that the DC voltage is less than the operation range, detect that the DC voltage is in the operation range, and control the converter circuit to resume conversion of DC voltage to the AC voltage in response to detection that the DC voltage is in the operation range.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION

Hereinafter, an alternating current (AC) inverter and a method of controlling the same according to exemplary embodiments will be described with reference to the accompanying drawings.

Figure 1:
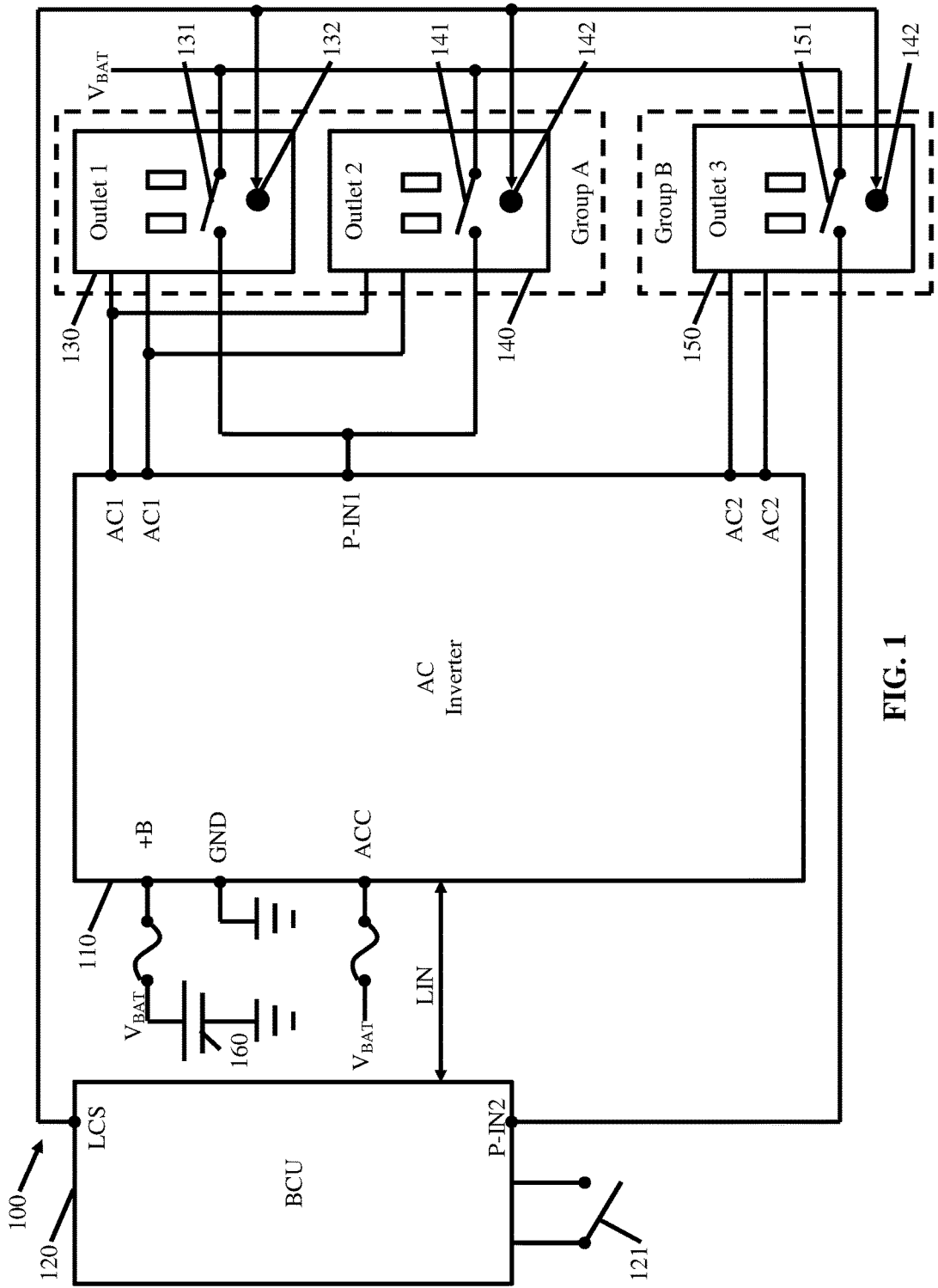
FIG. 1 is a diagram illustrating an alternating current (AC) inverter system according to an exemplary embodiment.

FIG. 1 is a diagram illustrating an AC inverter system 100 according to an exemplary embodiment.

Referring to FIG. 1, the AC inverter system 100 includes an AC inverter 110, a Body Control Unit (BCU) 120, an outlet 1 (130), an outlet 2 (140), and outlet 3 (150), and a battery 160.

The AC inverter 110 may be installed behind a trim or inside a console of a vehicle, making the AC inverter 110 not visible to users.

The AC inverter 110 receives a direct current (DC) voltage $V_{BAT}$ from the battery 160 through input terminals +B, ACC, and P-IN1 of the AC inverter 110. The AC inverter 110 converts the DC voltage $V_{BAT}$ to AC voltage. For example, the DC voltage $V_{BAT}$ may be 12 volts (V) between the input terminal +B and a ground terminal GND of the AC inverter 110. Also, a value of the AC voltage may depend on a region in which the AC inverter system 100 is used, 120 V in North America, 100 V in Japan, and 230 V for other regions.

The AC inverter 110 outputs the AC voltage through four AC output terminals AC1 and AC2 of the AC inverter 110. While FIG. 1 shows the AC inverter 110 including the four AC output terminals AC1 and AC2, one of ordinary skill in the art would recognize that the AC inverter 110 may include five or more AC output terminals.

The AC inverter 110 performs protection functions for stopping the operation of the AC inverter 110 when the AC inverter 110 detects an abnormality related to the AC inverter 110. By stopping the operation of the AC inverter 110 when an abnormality related to the AC inverter 110 is detected, the AC inverter 110 may prevent damage to the AC inverter 110 and electronic devices connected to the AC inverter 110 and/or may secure normal operation of the AC inverter 110 and the electronic devices connected to the AC inverter 110.

For example, the protection functions may include an input low voltage protection function, an input overvoltage protection function, an output overcurrent protection function, an output short-circuit protection function, and/or an overheat protection function. The input low voltage protection function stops operation of the AC inverter 110 when the AC inverter 110 is operating with the DC voltage $V_{BAT}$ (e.g., at the input terminal +B) that is less than a predetermined normal operation range, which may occur when the battery 160 is not sufficiently charged or the battery 160 is old. The input overvoltage protection function stops operation of the AC inverter 110 when the AC inverter 110 is operating with the DC voltage $V_{BAT}$ (e.g., at the input terminal +B) greater than the predetermined normal operation range, which may happen when a 24-volt battery is connected for a jump-up start of the vehicle or a voltage regulator for an alternator of the vehicle fails.

The output overcurrent protection function automatically stops operation of the AC inverter 110 when the AC inverter 110 detects an overload on the AC output terminals AC1 or AC2 for a time duration, e.g., some predetermined seconds of time. The time duration until the AC inverter 110 is stopped is considered because some electronic devices demand a large current only at the start for the time duration, and will not be an overload after the time duration. Such electronic devices may include, for example, an electronic device including a large motor, a video game console, and an electric light bulb.

The output short-circuit protection function automatically stops operation of the AC inverter 110 when the AC inverter 110 detects a short-circuit on the AC output terminals AC1 or AC2. The overheat protection function monitors temperatures of the AC inverter's power devices, and stops operation of the AC inverter 110 when a monitored temperature is higher than a predetermined threshold. The power devices may, for example, include power metal-oxide-semiconductor field-effect transistors (MOSFETs), power diodes, and/or power transistors.

The AC inverter 110 may receive information from sensors disposed in the AC inverter 110, and may detect an abnormality related to the AC inverter 110 based on the received information. For example, resistors disposed in the AC inverter 110 may divide the input DC voltage $V_{BAT}$, and a voltage that is generated by dividing the input DC voltage $V_{BAT}$ is used as information of the input DC voltage $V_{BAT}$ in the AC inverter 110. In another example, a resistor disposed on an output current path in the AC inverter 110 may transform an output current to a voltage across the resistor, and the transformed output current may be used as information of the output current in the AC inverter 110. The AC inverter 110 may use the information of the input DC voltage and/or the information of the output current to perform the protection functions, e.g., the input low voltage protection function, the input overvoltage protection function, and the output overcurrent protection function.

Each of the protection functions is classified into one among two groups of protection functions. A first group of protection functions includes protection functions resuming operation of the AC inverter 110 when the AC inverter 110 detects that an abnormality related to the AC inverter 110 is cured and that an operation is performed, e.g., by a user. A second group of protection functions includes protection functions resuming operation of the AC inverter 110 automatically when the AC inverter 110 detects that an abnormality related to the AC inverter 110 is cured (i.e., no user operation has occurred), thereby increasing convenience of the user. For example, the input low voltage protection function may be classified into the second group of protection functions, and the input overvoltage protection function, the output overcurrent protection function, the output short-circuit protection function, and/or the overheat protection function may be classified into the first group of protection functions.

For the first group of protection functions, to resume operation of the AC inverter 110 when the AC inverter 110 detects that an abnormality related to the AC inverter 110 is cured, a user may perform one of the following operations: 1) turning off and turning on again the vehicle, 2) pulling out all plugs inserted in outlets connected to the AC output terminals AC1 and AC2 and inserting the plugs back into the outlets, and 3) pulling out all the plugs inserted in the outlets in Group A, as discussed below, turning off (i.e., opening) a switch 121 of the BCU 120, and then turning on (i.e. closing) the switch 121 again, as also discussed below. With respect to operations 2) and 3), the user does not have to stop the vehicle to resume operation of the AC inverter 110, thereby increasing the convenience of the user. With respect to operation 3), the user does not have to leave the seat to pull a plug from the outlets in Group B, as discussed below, which may be disposed in a remote area of the vehicle, because the switch 121 is disposed close to seats in the vehicle, thereby further increasing the convenience of the user.

The BCU 120 receives information of the AC inverter system 100 from elements of the AC inverter system 100 through communication lines or signal lines, e.g., a communication line LIN. For example, the information of the AC inverter system 100 may include a voltage, a current, and/or an amount of load on the battery 160. The BCU 120 further generates and transmits control signals to the elements of the AC inverter system 100 through the communication lines, to control and/or monitor the elements of the AC inverter system 100.

The BCU 120 includes the switch 121 that may be advantageously disposed on an instrument panel of the vehicle so that a user can easily reach the switch 121. The switch 121 is used to control a supply of power to one or more outlets in a group of outlets connected to the AC inverter 110, e.g., the outlet 3 (150) in Group B.

The BCU 120 is connected to the AC inverter 110 through the communication line LIN, and communicates with the AC inverter 110 through the communication line LIN.

The outlet 1 (130), the outlet 2 (140), and the outlet 3 (150) may be installed to be visible to users for ease of user. For example, the outlet 1 (130), the outlet 2 (140), and the outlet 3 (150) may be installed on a trim, cabin, and/or a console of a vehicle, on a cargo area of a pickup truck or a minivan, and/or outside the vehicle.

While FIG. 1 shows the AC inverter system 100 including three outlets, namely, the outlet 1 (130), the outlet 2 (140), and the outlet 3 (150), one of ordinary skill in the art would recognize that the AC inverter system 100 may include any number of outlets, e.g., one or more outlets.

Each of the outlet 1 (130), the outlet 2 (140), and the outlet 3 (150) includes a pair of receptacles. The receptacles are metal parts configured to contact terminals of a plug of an electronic device, and transmit the AC voltage output by the AC inverter 110 to the contacted terminals. While FIG. 1 shows each of the outlet 1 (130), the outlet 2 (140), and the outlet 3 (150) including two receptacles, one of ordinary skill in the art would recognize that the AC inverter system 100 may include any number of receptacles, e.g., two or more receptacles. Also, one of ordinary skill in the art would recognize that the receptacles may be of various types depending on the region in which the AC inverter system 100 is used.

The outlet 1 (130) includes a switch 131 and a light-emitting diode (LED) 132, the outlet 2 (140) includes a switch 141 and an LED 142, and the outlet 3 (150) includes a switch 151 and an LED 152. Each of the switch 131, the switch 141, and the switch 151 is configured to be closed when a user inserts the plug into a respective outlet among the outlet 1 (130), the outlet 2 (140), and the outlet 3 (150). Each of the LED 132, the LED 142, and the LED 152 is configured to receive a control signal LCS from the BCU 120, and turn on and off based on the received control signal LCS. Each of the LED 132, the LED 142, and the LED 152 may indicate a status of a respective one among the outlet 1 (130), the outlet 2 (140), and the outlet 3 (150), e.g., an availability of AC voltage at a respective one among the outlet 1 (130), the outlet 2 (140), and the outlet 3 (150).

Each of the outlet 1 (130), the outlet 2 (140), and the outlet 3 (150) can be classified into one among several groups of outlets. For example, FIG. 1 shows two groups of outlets, Group A and Group B. The outlet 1 (130) and the outlet 2 (140) are classified into Group A, and the outlet 3 (150) is classified into Group B. While FIG. 1 shows the AC inverter system 100 including the two groups of outlets, one of ordinary skill in the art would recognize that the AC inverter system 100 may include three or more groups of outlets.

The receptacles of each of the outlet 1 (130) and the outlet 2 (140) in Group A are connected to two of the four AC output terminals, e.g., the AC output terminals AC1. The receptacles of the outlet 3 (150) in Group B are connected to another two of the four AC output terminals, e.g., the AC output terminals AC2.

Each of the switch 131 and the switch 141 in Group A is connected to the AC inverter 110 through the input terminal P-IN1 of the AC inverter 110. The switch 151 in Group B is connected to the BCU 120 through an input terminal P-IN2 of the BCU 120. In another exemplary embodiment, the AC inverter 110 may include the input terminal P-IN2, and may be connected to the switch 151 through the input terminal P-IN2 of the AC inverter 110.

The battery 160 supplies the DC voltage $V_{BAT}$ to the AC inverter 110 through the input terminals +B, ACC, and P-IN1. In detail, the battery 160 supplies the DC voltage $V_{BAT}$ to the input terminal +B. The battery 160 supplies the DC voltage $V_{BAT}$ to the input terminal ACC when the vehicle is turned on or when a user sets the vehicle to an accessory only mode, e.g., with a key or a button. The battery 160 supplies the DC voltage $V_{BAT}$ to the input terminal P-IN1 when the switch 131 or the switch 141 is closed by a plug. In addition, the battery 160 supplies the DC voltage $V_{BAT}$ to the BCU 120 through the input terminal P-In2 when the switch 151 is closed by a plug. In exemplary embodiments, the battery 160 may be a vehicle battery or a car battery.

Figure 2:
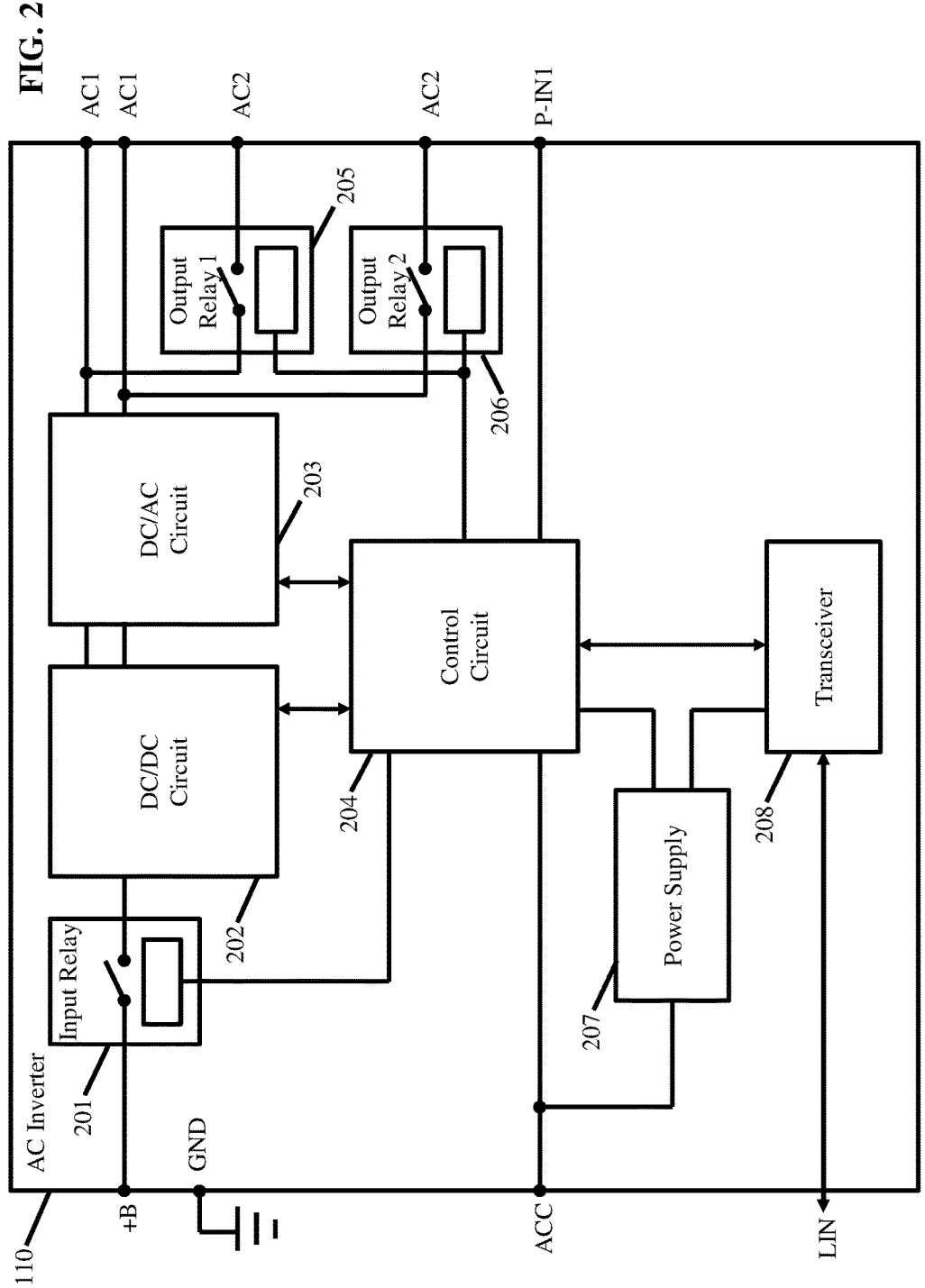
FIG. 2 is a diagram illustrating an AC inverter according to an exemplary embodiment.

FIG. 2 is a diagram illustrating the AC inverter 110 according to an exemplary embodiment.

Referring to FIG. 2, the AC inverter 110 includes an input relay 201, a DC/DC circuit 202, an DC/AC circuit 203, a control circuit 204, an output relay 1 (205), an output relay 2 (206), a power supply 207, and a transceiver 208. The AC inverter 110 further includes nine input/output terminals, the input terminal +B, the terminal GND, the input terminal ACC, the communication line LIN, the two AC output terminals AC1, the two AC output terminals AC2, and the input terminal P-IN1.

The input relay 201 receives a DC voltage (e.g., 12 V) from the battery 160 of FIG. 1 through the input terminal +B, and transmits the received DC voltage to the DC/DC circuit 202 when a switch of the input relay 201 is closed. In other words, the input relay 201 is configured to connect and disconnect the input terminal +B from the DC/DC circuit 202. The switch of the input relay 201 is configured to open and close based on a control of the control circuit 204.

The DC/DC circuit 202 receives the DC voltage from the input relay 201, and generates a high DC voltage (e.g., about 108 V to 200 V so the AC inverter 110 may output an AC voltage of 120 V based on the received DC voltage, and transmits the high DC voltage to the DC/AC circuit 203. Input terminals and output terminals of the DC/DC circuit 202 are electrically-isolated, i.e., there is no direct connection between the input terminals and the output terminals.

The DC/AC circuit 203 receives the high DC voltage from the DC/DC circuit 202, converts the received high DC voltage into the AC voltage that may power an electronic device, outputs the AC voltage through the AC output terminals AC1, and transmits the AC voltage to each of the output relay 1 (205) and the output relay 2 (206). A waveform of the AC voltage may be a sinusoidal waveform or a rectangular waveform. The sinusoidal waveform is also output by an outlet at home, but is generated and controlled by a circuit that is more complicated than a circuit generating and controlling the rectangular waveform. The rectangular waveform is easier to generate and control, but there are some electronic devices that cannot work with the rectangular waveform.

The control circuit 204 controls operation of the input relay 201, the DC/DC circuit 202, the DC/AC circuit 203, the output relay 1 (205), the output relay 2 (206), and the transceiver 208. For example, the control circuit 204 performs the protection functions stopping operation of the DC/DC circuit 202 and the DC/AC circuit 203 when the control circuit 204 detects an abnormality related to the AC inverter 110. The control circuit 204 also detects insertion of a plug into an outlet in Group A (e.g., the outlet 1 (130) of FIG. 1) through the input terminal P-IN1 that is connected to the control circuit 204.

The control circuit 204 receives the DC voltage from the battery 160 of FIG. 1 through the input terminal ACC. The AC inverter 110 includes two power supply lines through the input terminals +B and ACC because even when the switch of input relay 201 is open disconnecting the input terminal +B from the DC/DC circuit 202, power is supplied to the control circuit 204 and the transceiver 208 through the input terminal ACC.

According to an exemplary embodiment, the control circuit 204 may include two integrated circuits (ICs) and one microprocessor. One among the ICs may control operation of the DC/DC circuit 202 and some of the protective functions, another one among the ICs may control operation of DC/AC circuit 203 and other protective functions, and the microprocessor may control the input relay 201, the output relay 1 (205) and the output relay 2 (206), may encode a message to the BCU 120, and may decode a message from the BCU 120. According to another exemplary embodiment, the control circuit 204 may include one microprocessor. One of ordinary skill in the art would recognize that other exemplary embodiments are not limited to the above exemplary embodiments.

Each of the output relay 1 (205) and the output relay 2 (206) receives the AC voltage from the DC/AC circuit 203, and outputs the received AC voltage through a respective one among the AC output terminals AC2 when a switch of a respective one among the output relay 1 (205) and the output relay 2 (206) is closed. In other words, the output relay 1 (205) and the output relay 2 (206) are configured to connect and disconnect the DC/AC circuit 203 from the AC output terminals AC2 to control output of the AC voltage to an outlet in Group B, e.g., the outlet 3 (150) of FIG. 1. The switch of each of the output relay 1 (205) and the output relay 2 (206) is configured to open and close based on a control of the control circuit 204. While FIG. 2 shows two output relays, one of ordinary skill in the art would recognize that the AC inverter 110 may include any number of pairs of output relays (e.g., two, four, or six output relays) depending on a number of corresponding outlets in Group B.

The power supply 207 receives the DC voltage (e.g., 12 V) from the battery 160 of FIG. 1 through the input terminal ACC, generates a low DC voltage (e.g., 5 V or 3.3 V) based on a specification of the control circuit 204 and the transceiver 208, and transmits the low DC voltage to the control circuit 204 and the transceiver 208.

The transceiver 208 receives a signal from a local interconnect network (LIN) network (e.g., including the BCU 120 of FIG. 1) through the communication line LIN, decodes the signal into information or data, and transmits the information to the control circuit 204. The transceiver 208 also receives information or data from the control circuit 204, encodes the information into a signal, and transmits the encoded signal to the LIN network through the communication line LIN.

Figure 3:
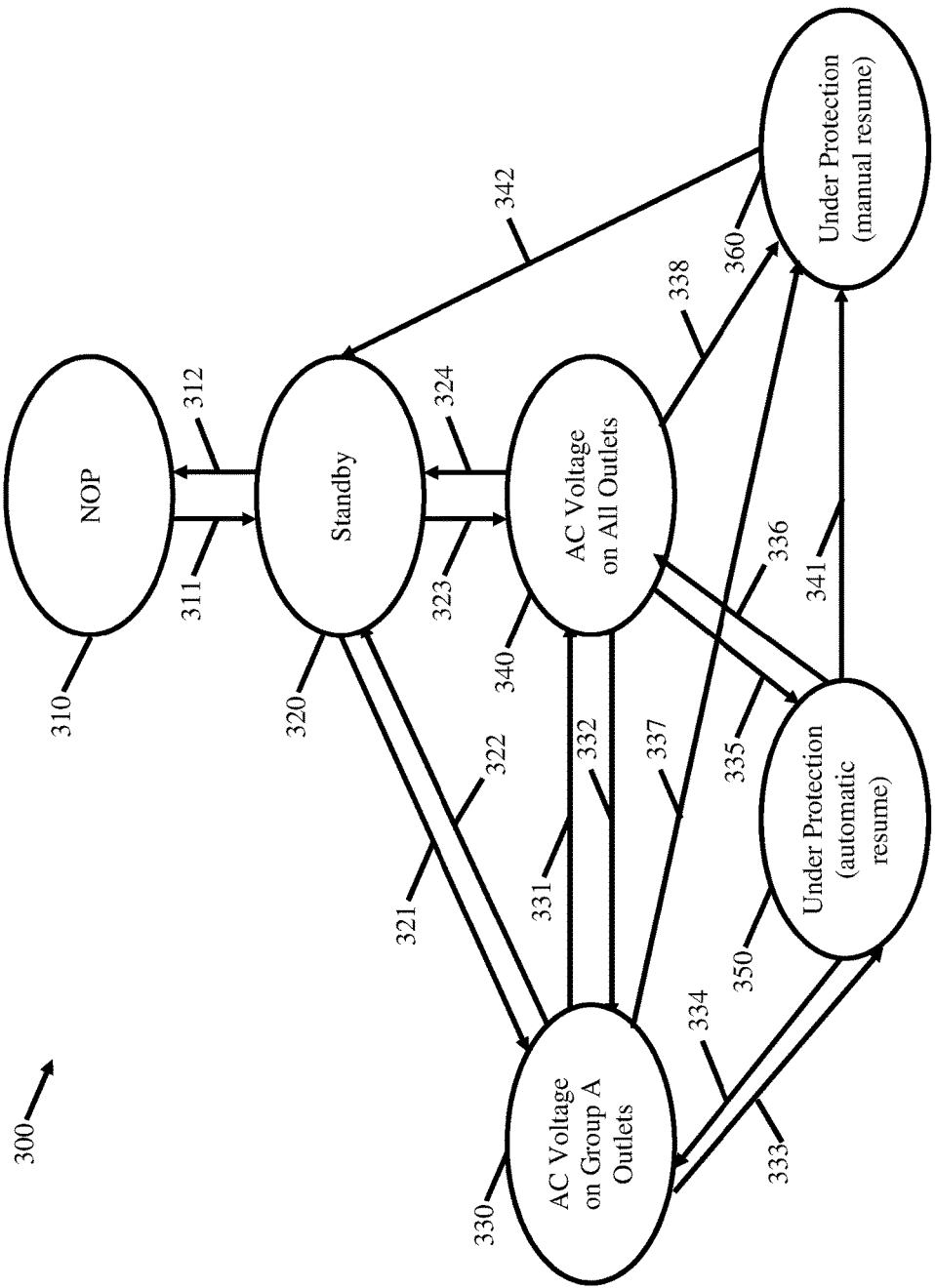
FIG. 3 is a state diagram illustrating a method of controlling an AC inverter, according to an exemplary embodiment.

FIG. 3 is a state diagram illustrating a method 300 of controlling the AC inverter 110, according to an exemplary embodiment.

Referring to FIG. 3, the AC inverter 110 may operate in a no operation (NOP) state 310, a standby state 320, a first on state 330 in which an AC voltage is placed on outlets in Group A, a second on state 340 in which the AC voltage is placed on all outlets, a first under protection state 350 in which the AC voltage may automatically resume when an abnormality cures, and a second under protection state 360 in which the AC voltage may manually resume when an abnormality cures.

A state transition 311 occurs when the battery 160 applies the DC voltage to the input terminal ACC. The AC inverter 110 transitions from the NOP state 310 to the standby state 320 in which the control circuit 204 starts to operate and the transceiver 208 is ready to receive and send a LIN message through the communication line LIN.

A state transition 312 occurs when the battery 160 stops applying the DC voltage to the input terminal ACC. The AC inverter 110 transitions from the standby state 320 to the NOP state 310 in which the control circuit 204 stops operating and the transceiver 208 is not receiving and sending a LIN message through the communication line LIN.

A state transition 321 occurs when the transceiver 208 receives the LIN message for activating the AC inverter 110 from the BCU 120 through the communication line LIN. The AC inverter 110 transitions from the standby state 320 to the first on state 330 in which the control circuit 204 controls the input relay 201 to be closed, and controls the DC/DC circuit 202 and the DC/AC circuit 203 to generate the AC voltage and output the AC voltage to the outlets in Group A.

A state transition 322 occurs when the transceiver 208 receives the LIN message for deactivating the AC inverter 110 from the BCU 120 through the communication line LIN. The AC inverter 110 transitions from the first on state 330 to the standby state 320 in which the control circuit 204 controls the input relay 201 to be open, and controls the DC/DC circuit 202 and the DC/AC circuit 203 to stop generating the AC voltage.

A state transition 323 occurs when the transceiver 208 receives, from the BCU 120 through the communication line LIN, the LIN message for activating the AC inverter 110 and the LIN message instructing the AC inverter 110 to supply power to outlets in Group B. The AC inverter 110 transitions from the standby state 320 to the second on state 340 in which the control circuit 204 controls the input relay 201 and the output relay 1 (205) and the output relay 2 (206) to be closed, and controls the DC/DC circuit 202 and the DC/AC circuit 203 to generate the AC voltage and output the AC voltage to the outlets in Groups A and B.

A state transition 324 occurs when the transceiver 208 receives, from the BCU 120 through the communication line LIN, the LIN message for deactivating the AC inverter 110 and the LIN message instructing the AC inverter 110 to stop the supply of power to the outlets in Group B. The AC inverter 110 transitions from the second on state 340 to the standby state 320 in which the control circuit 204 controls the input relay 201 and the output relay 1 (205) and the output relay 2 (206) to be open, and controls the DC/DC circuit 202 and the DC/AC circuit 203 to stop generating the AC voltage.

A state transition 331 occurs when the transceiver 208 receives, from the BCU 120 through the communication line LIN, the LIN message instructing the AC inverter 110 to supply power to outlets in Group B. The AC inverter 110 transitions from the first on state 330 to the second on state 340 in which the control circuit 204 controls the output relay 1 (205) and the output relay 2 (206) to be closed, maintains control of the DC/DC circuit 202 and the DC/AC circuit 203 to generate the AC voltage, and controls the DC/AC circuit 203, the output relay 1 (205), and the output relay 2 (206) to output the AC voltage to the outlets in Groups A and B.

A state transition 332 occurs when the transceiver 208 receives, from the BCU 120 through the communication line LIN, the LIN message instructing the AC inverter 110 to stop the supply of power to the outlets in Group B. The AC inverter 110 transitions from the second on state 340 to the first on state 330 in which the control circuit 204 controls the output relay 1 (205) and the output relay 2 (206) to be open, and maintains control of the DC/DC circuit 202 and the DC/AC circuit 203 to generate the AC voltage and output the AC voltage to the outlets in Group A.

A state transition 333 occurs when the control circuit 204 detects that the input DC voltage is less than the normal operation range. The AC inverter 110 transitions from the first on state 330 to the first under protection state 350 in which the control circuit 204 controls the DC/DC circuit 202 and/or the DC/AC circuit 203 to stop generating the AC voltage, and the transceiver 208 places, on the communication line LIN, a LIN message indicating that the output of the AC voltage to all of the outlets is suspended and a LIN message indicating that manual operation to resume the output of the AC voltage is not necessary.

A state transition 334 occurs when the control circuit 204 detects that the input DC voltage is in the normal operation range. The AC inverter 110 transitions from the first under protection state 350 to the first on state 330 in which the control circuit 204 controls the DC/DC circuit 202 and the DC/AC circuit 203 to generate the AC voltage and output the AC voltage to the outlets in Group A, and the transceiver 208 places, on the communication line LIN, a LIN message indicating that the output of the AC voltage to all of the outlets is not suspended. In this transition, the LIN message indicating that manual operation to resume the output of the AC voltage is not necessary and is removed from the communication line LIN.

A state transition 335 occurs when the control circuit 204 detects that the input DC voltage is less than the normal operation range. The AC inverter 110 transitions from the second on state 340 to the first under protection state 350 in which the control circuit 204 controls the DC/DC circuit 202 and/or the DC/AC circuit 203 to stop generating the AC voltage, and the transceiver 208 places, on the communication line LIN, the LIN message indicating that the output of the AC voltage to all of the outlets is suspended and the LIN message indicating that manual operation to resume the output of the AC voltage is not necessary.

A state transition 336 occurs when the control circuit 204 detects that the input DC voltage is in the normal operation range. The AC inverter 110 transitions from the first under protection state 350 to the second on state 340 in which the control circuit 204 controls the DC/DC circuit 202 and the DC/AC circuit 203 to generate the AC voltage and output the AC voltage to the outlets in Groups A and B, and the transceiver 208 places, on the communication line LIN, the LIN message indicating that the output of the AC voltage to all of the outlets is not suspended. In this transition, the LIN message indicating that manual operation to resume the output of the AC voltage is not necessary and is removed from the communication line LIN.

A state transition 337 occurs when the control circuit 204 detects an abnormality related to the AC inverter 110 besides that the input DC voltage is less than the normal operation range. For example, the input overvoltage protection function, the output overcurrent protection function, the output short-circuit protection function, and/or the overheat protection function may be activated. The AC inverter 110 transitions from the first on state 330 to the second under protection state 360 in which the control circuit 204 controls the input relay 201 to be open, and controls the DC/DC circuit 202 and/or the DC/AC circuit 203 to stop generating the AC voltage, and the transceiver 208 places, on the communication line LIN, the LIN message indicating that the output of the AC voltage to all of the outlets is suspended and a LIN message indicating that manual operation to resume the output of the AC voltage is necessary.

A state transition 338 occurs when the control circuit 204 detects an abnormality related to the AC inverter 110 besides that the input DC voltage is less than the normal operation range. For example, the input overvoltage protection function, the output overcurrent protection function, the output short-circuit protection function, and/or the overheat protection function may be activated. The AC inverter 110 transitions from the second on state 340 to the second under protection state 360 in which the control circuit 204 controls the DC/DC circuit 202 and/or the DC/AC circuit 203 to stop generating the AC voltage, and the transceiver 208 places, on the communication line LIN, the LIN message indicating that the output of the AC voltage to all of the outlets is suspended and the LIN message indicating that manual operation to resume the output of the AC voltage is necessary.

A state transition 341 occurs when the control circuit 204 detects an abnormality related to the AC inverter 110 besides that the input DC voltage is less than the normal operation range. For example, the input overvoltage protection function, the output overcurrent protection function, the output short-circuit protection function, and/or the overheat protection function may be activated. The AC inverter 110 transitions from the first under protection state 350 to the second under protection state 360 in which the transceiver 208 places, on the communication line LIN, the LIN message indicating that manual operation to resume the output of the AC voltage is necessary.

A state transition 342 occurs when the transceiver 208 receives, from the BCU 120 through the communication line LIN, the LIN message for deactivating the AC inverter 110 and the LIN message instructing the AC inverter 110 to stop the supply of power to the outlets in Group B. The AC inverter 110 transitions from the second under protection state 360 to the standby state 320 in which the control circuit 204 controls the input relay 201, the output relay 1 (205) and the output relay 2 (206) to be open, and the transceiver 208 is ready to receive and send a LIN message through the communication line LIN.

Operation of the AC inverter 110 is now described in further detail with reference to FIGS. 1, 2, and 3. When the vehicle is turned off, the battery 160 does not supply the DC voltage to the input terminals ACC. In this case, the control circuit 204 is turned off and the input relay 201, the output relay 1 (205), and the output relay 2 (206) are kept open. If no plugs are inserted into the outlet 1 (130), the outlet 2 (140), and the outlet 3 (150), the switch 131, the switch 141, and the switch 151 are open, respectively. In this case, the AC inverter 110 is in the NOP state 310 of FIG. 3.

When the vehicle is turned on by a user, the battery 160 supplies the DC voltage to the input terminal ACC, and thus supplies the DC voltage to the control circuit 204, the power supply 207, and the transceiver 208. In this case, the transceiver 208 may receive a message or command from the BCU 120, and the control circuit 204 is ready to start operation of the DC/DC circuit 202 and the DC/AC circuit 203. However, the control circuit 204 still controls the input relay 201 to be open. In this case, the AC inverter 110 is in the standby state 320 of FIG. 3.

The BCU 120 monitors the information of the vehicle including the AC inverter system 100, and based on the monitored information, determines whether all conditions for activating the AC inverter 110 are satisfied. When the BCU 120 determines that all conditions for activating the AC inverter 110 are satisfied, the BCU 120 generates a LIN message for activating the AC inverter 110, and places this LIN message on the LIN network, e.g., the communication line LIN. For example, the conditions for activating the AC inverter 110 may include whether there is enough charge in the battery 160, whether a total load on the battery 160 is low enough, whether an engine of the vehicle is running, and/or whether a plug is inserted into one of the outlets. When the BCU 120 determines that at least one among the conditions for activating the AC inverter 110 are not satisfied, the BCU 120 generates a LIN message for deactivating the AC inverter 110, and places this LIN message on the LIN network, e.g., the communication line LIN. In exemplary embodiments, insertion of a plug of an electronic device into one of the outlets may be necessary to generate the LIN message for activating the AC inverter 110.

When the user inserts a plug into the outlet 1 (130) and/or the outlet 2 (140) in Group A, the switch 131 and/or the switch 141 in Group A is closed, and the battery 160 supplies the DC voltage to the AC inverter 110 through the input terminal P-IN1. In this sense, the input terminal P-IN1 is a terminal for a high/low signal. The control circuit 204 detects the DC voltage on the input terminal P-IN1, generates a LIN message notifying that a plug is inserted into one of the outlets in Group A, and places the LIN message on the communication line LIN. The BCU 120 receives this LIN message through the communication line LIN, and checks other conditions for the activation of the AC inverter 110. If all of the other conditions are satisfied, the BCU 120 generates the LIN message for activating the AC inverter 110, and places the LIN message on the communication line LIN. When the transceiver 208 receives the LIN message for activating the AC inverter 110 from the BCU 120 through the communication line LIN, the control circuit 204 controls the input relay 201 to be closed so that the battery 160 supplies the DC voltage to the DC/DC circuit 202 through the input terminal +B. In this case, the control circuit 204 also controls the DC/DC circuit 202 and the DC/AC circuit 203 to start operation to generate the AC voltage and output the AC voltage to the outlet 1 (130) and the outlet 2 (140) in Group A through the AC output terminals AC1. Here, the AC inverter 110 is in the "AC Voltage on Group A Outlets" state (the first on state 330) of FIG. 3, and this operation of the AC inverter 110 corresponds to the state transition 321 of FIG. 3.

In the "AC Voltage on Group A Outlets" state (the first on state 330), when the user pulls out all of the plugs from the outlets in Group A, all of the switches 131 and the switch 141 in Group A are opened, and the battery 160 does not supply the DC voltage to the AC inverter 110 through the input terminal P-IN1. The control circuit 204 does not detect the DC voltage on the input terminal P-IN1, so the control circuit 204 generates a LIN message notifying that all of the outlets in Group A are plugged out, and places the LIN message on the communication line LIN. The BCU 120 receives this LIN message through the communication line LIN. Since at least one condition for the activation of the AC inverter 110 is not satisfied, the BCU 120 generates the LIN message for deactivating the AC inverter 110 and places the LIN message on the communication line LIN. When the transceiver 208 receives the LIN message for deactivating the AC inverter 110 from the BCU 120 through the communication line LIN, the control circuit 204 controls the DC/DC circuit 202 and the DC/AC circuit 203 to stop operation and controls the input relay 201 to be open so that no AC voltage is supplied to the outlet 1 (130) and the outlet 2 (140) in Group A through the AC output terminals AC1. The state of the AC inverter 110 returns to the standby state 320 of FIG. 3, and this operation corresponds to the state transition 322 of FIG. 3.

In the standby state 320, when the user inserts a plug into the outlet 3 (150) in Group B, the switch 151 in Group B is closed, and the battery 160 supplies the DC voltage to the BCU 120 through the input terminal P-IN2. The BCU 120 detects the DC voltage through the input terminal P-IN2. When the user additionally turns on (i.e., closes) the switch 121, the BCU 120 generates a LIN message for activating the AC inverter 110 and another LIN message for instructing the AC inverter 110 to supply power to the outlet 3 (150) in Group B, and places these LIN messages on the LIN network, e.g., the communication line LIN. When the transceiver 208 receives the LIN message for activating the AC inverter 110 and the LIN message instructing the AC inverter 110 to supply power to the outlet 3 (150) in Group B, the control circuit 204 controls the input relay 201 to be closed so that the battery 160 supplies the DC voltage to the DC/DC circuit 202 through the input terminal +B. In this case, the control circuit 204 also controls the DC/DC circuit 202 and the DC/AC circuit 203 to start operation to generate the AC voltage and output the AC voltage to the outlet in Group A through the AC output terminals AC1, and controls the output relay 1 (205) and the output relay 2 (206) to be closed to output the AC voltage to the outlet 3 (150) in Group B through the AC output terminals AC2. In other words, to supply power to an outlet in Group B, an additional condition of the user turning on the switch 121 is used. Now, the AC inverter 110 is in the "AC Voltage on All Outlets" state (the second on state 340) of FIG. 3, and this operation corresponds to the state transition 323 of FIG. 3.

In the "AC Voltage on Group A Outlets" state (the first on state 330), when the user additionally inserts a plug of an electronic device into the outlet 3 (150) of Group B and turns on (i.e., closes) the switch 121, the BCU 120 generates a LIN message for instructing the AC inverter 110 to supply power to the outlet 3 (150) in Group B, and places this LIN message on the LIN network, e.g., the communication line LIN. When the transceiver 208 receives the LIN message instructing the AC inverter 110 to supply power to the outlet 3 (150) in Group B, the control circuit 204 controls the output relay 1 (205) and the output relay 2 (206) to be closed to output the AC voltage to the outlet 3 (150) in Group B through the AC output terminals AC2. As a result, the AC voltage is supplied to the outlet 1 (130), the outlet 2 (140), and the outlet 3 (150). In this process, the state of the AC inverter 110 moves from the "AC Voltage on Group A Outlets" state (the first on state 330) to the "AC Voltage on All Outlets" state (the second on state 340), and this operation corresponds to the state transition 331 of FIG. 3.

In the "AC Voltage on All Outlets" state (the second on state 340) with the outlets of both Group A and Group B being plugged in, when the user pulls out the plug from the outlet 3 (150), the BCU 120 generates a LIN message for instructing the AC inverter 110 not to supply power to the outlet 3 (150) in Group B due to an absence of the DC voltage on the terminal P-IN2, and places this LIN message on the LIN network, e.g., the communication line LIN, while keeping the LIN message for activating the AC inverter 110 on the communication line LIN. When the transceiver 208 receives the LIN message instructing the AC inverter 110 not to supply power to the outlet 3 (150) in Group B, the control circuit 204 controls the output relay 1 (205) and the output relay 2 (206) to be open to cease output of the AC voltage to the outlet 3 (150) in Group B through the AC output terminals AC2. As a result, the AC inverter 110 stops supplying the AC voltage to the outlet 3 (150). In this process, the state of the AC inverter 110 moves from the "AC Voltage on All Outlets" state (the second on state 340) to the "AC Voltage on Group A Outlets" state (the first on state 330), and this operation corresponds to the state transition 332 of FIG. 3. If the user turns of the switch 121 instead of pulling out the plug from the outlet 3 (150), the same process and the same result are obtained.

In the "AC Voltage on All Outlets" state (the second on state 340), when all plugs inserted into the outlet 1 (130), the outlet 2 (140), and the outlet 3 (150) are pulled out, the switch 131, the switch 141, and the switch 151 are open. In this case, the control circuit 204 detects an absence of the DC voltage on the input terminal P-IN1, so the control circuit 204 generates a LIN message notifying that all of the outlets in Group A are plugged out, and places the LIN message on the communication line LIN. The BCU 120 receives this LIN message through the communication line LIN, and detects that all outlets of Group A are plugged out. At the same time, since an absence the DC voltage on the input terminal P-IN2 is detected, at least one condition for activating the AC inverter 110 is not satisfied, and the BCU 120 generates a LIN message for deactivating the AC inverter 110 and a LIN message for instructing the AC inverter 110 not to supply power to the outlet 3 (150) in Group B, and places these LIN messages on the LIN network, e.g., the communication line LIN. When the transceiver 208 receives the LIN message for deactivating the AC inverter 110 and the LIN message for instructing the AC inverter 110 not to supply power to the outlet 3 (150) in Group B, the control circuit 204 controls the input relay 201, the output relay 1 (205), and the output relay 2 (206) to be open. In this operation, the state of the AC inverter 110 moves from "AC Voltage on All Outlets" state (the second on state 340) to the standby state 320, and this operation corresponds to the state transition 324 of FIG. 3.

In the "AC Voltage on Group A Outlets" state (the first on state 330) or in the "AC Voltage on All Outlets" state (the second on state 340), when the DC voltage $V_{BAT}$ (the input voltage) becomes less than the normal operation range (e.g., 11 V-16 V), the AC inverter 110 stops outputting the AC voltage to the outlet with the operation described above in the state transition 333 or 335. When the DC voltage $V_{BAT}$ returns to be in the normal operation range, the AC inverter 110 outputs the AC voltage on the outlet again with the operation described above in the state transition 334 or 336. In other words, the AC inverter resumes automatically from the input low voltage protection when the input voltage returns to be in the normal operation range (i.e., when the abnormality cures).

In the "AC Voltage on Group A Outlets" state (the first on state 330) or in the "AC Voltage on All Outlets" state (the second on state 340), when the control circuit 204 detects an abnormality related to the AC inverter 110 besides that the input DC voltage is less than the normal operation range, the AC inverter 110 stops outputting the AC voltage to the outlet with the operation described above in the state transition 337, 338, or 341. In the "Under Protection (manual resume)" state (the second under protection state 360), a single operation or plural operations including pulling out the plug(s) from all of the outlets and turning off (opening) the switch 121 moves the state of the AC inverter 110 to the standby state 320 under a condition that the abnormality cures. Then, when the user inserts a plug into one of the outlets again, the AC inverter 110 starts supplying the AC voltage to the outlet again. In other words, the AC inverter 110 resumes from the under protection state in response to connection and disconnection of a load to the output terminals.

One of ordinary skill in the art would recognize that LIN communication may be replaced by controller area network (CAN) communication.

In a second exemplary embodiment, insertion of a plug of an electronic device into one of the outlets in Group A is not necessary for the BCU 120 to generate the LIN message for activating the AC inverter 110. In this case, the control circuit 204 does not generate a LIN message notifying that a plug is inserted into one of the outlets in Group A. The BCU 120 generates the LIN message for activating the AC inverter when all conditions are satisfied as described above, but the conditions do not include insertion of a plug into an outlet in Group A. The control circuit 204 controls the input relay 201 to be closed, and controls the DC/DC circuit 202 and the DC/AC circuit 203 to start operation to generate the AC voltage and output the AC voltage to the outlet 1 (130) and the outlet 2 (140) in Group A through the AC output terminals AC1, if the control circuits receives the LIN message for activating the AC inverter 110 through the transceiver 208 and detects the DC voltage on the input terminal P-IN1.

In a third exemplary embodiment, the input terminal P-IN2 is disposed on the AC inverter 110 instead of on the BCU 120. In this case, the BCU 120 generates the LIN message for instructing the AC inverter to output the AC voltage to the outlet 150 in Group B based on only the state of the switch 121. The control circuit 204 controls the output relay 1 (205) and the output relay 2 (206) to be closed when the control circuit 204 detects the insertion of a plug into the outlet 150 in Group B through the input terminal P-IN2 on the AC inverter 110 or the transceiver 208 receives the LIN message for instructing to output the AC voltage to the outlet 150 in Group B.

In the third exemplary embodiment, if the switch 121 is also disposed on the AC inverter 110, one of ordinary skill in the art would easily recognize that the BCU 120 does not have to generate the LIN message for instructing the AC inverter 110 to output the AC voltage to the outlet 150 in Group B. In this case, the control circuit 204 will obtain conditions to control the output relay 1 (205) and the output relay 2 (206) directly from the input terminal P-IN2 and the switch 121.

One of ordinary skill in the art would recognize that the second and third exemplary embodiments can be combined with some modification to avoid conflict.

According to the exemplary embodiments described above, the second group of protection functions resumes operation of the AC inverter 110 automatically when the AC inverter 110 detects that an abnormality (e.g., an input low voltage) in the AC inverter 110 is cured, thereby increasing the convenience of a user. For the first group of protection functions, to resume operation of the AC inverter 110, the user may pull out all plugs inserted in outlets, and thus the user is not required to stop the vehicle to resume operation of the AC inverter 110, thereby further increasing the convenience of the user. Also, for the first group of protection functions, to resume operation of the AC inverter 110, the user may pull out all the plugs inserted in outlets in Group A and turn off the switch 121 of the BCU 120, and thus the user is not required to leave the seat to pull a plug from an outlet in Group B that is disposed outside the vehicle. This is because the switch 121 is disposed in the vehicle, thereby further increasing the convenience of the user.

Although the above description relates to exemplary embodiments, it is to be understood that many modifications and changes may easily be added by those skilled in the art and that the not limited only to the exemplary embodiments above.

The invention claimed is:

1. An alternating current (AC) inverter comprising:
   a converter circuit configured to convert a direct current (DC) voltage to an AC voltage;
   a first pair of output terminals, the converter circuit being configured to output the AC voltage to the first pair of output terminals;
   a second pair of output terminals, the converter circuit being configured to output the AC voltage to the second pair of output terminals; and
   a control circuit configured to:
      receive a first signal and a second signal;
      control the converter circuit to output the AC voltage to the first pair of output terminals in response to reception of the first signal;
      control the converter circuit to output the AC voltage to the first pair of output terminals and the second pair of output terminals in response to reception of the first signal and the second signal;
      detect, based on the first signal, that the first pair of output terminals are disconnected from a load and then reconnected to the load after conversion of the DC voltage to the AC voltage stops in response to detection of an abnormality;
      detect, based on the second signal, that the second pair of output terminals are disconnected from another load and then reconnected to the other load after conversion of the DC voltage to the AC voltage stops in response to detection of the abnormality; and
      control the converter circuit to resume conversion of the DC voltage to the AC voltage in response to detection that the first pair of output terminals are disconnected from the load and then reconnected to the load and detection that the second pair of output terminals are disconnected from the other load and then reconnected to the other load.

2. The AC inverter of claim 1, further comprising output relays configured to receive the AC voltage respectively from the first pair of output terminals,
   wherein the control circuit is further configured to control the output relays to be closed to transmit the AC voltage respectively to the second pair of output terminals in response to reception of the first signal and the second signal.

3. The AC inverter of claim 1, wherein the control circuit is further configured to detect the abnormality, based on a performance of at least one among an input overvoltage protection function, an output overcurrent protection function, an output short-circuit protection function, and an overheat protection function.

4. The AC inverter of claim 1, wherein the control circuit is further configured to:
   detect that the DC voltage is less than an operation range;
   control the converter circuit to stop conversion of the DC voltage to the AC voltage in response to detection that the DC voltage is less than the operation range;
   detect that the DC voltage is in the operation range; and
   control the converter circuit to resume conversion of the DC voltage to the AC voltage in response to detection that the DC voltage is in the operation range.

5. The AC inverter of claim 1, wherein the control circuit is further configured to:
   detect, based on the first signal, that the first pair of output terminals are connected to a first load;
   detect, based on the second signal, that the second pair of output terminals are connected to a second load;
   control the converter circuit to output the AC voltage to the first pair of output terminals in response to detection that the first pair of output terminals are connected to the first load; and control the converter circuit to output the AC voltage to the first pair of output terminals and the second pair of output terminals in response to detection that the first pair of output terminals are connected to the first load and detection that the second pair of output terminals are connected to the second load.

6. The AC inverter of claim 5, wherein the first signal is received from a first outlet connected to the first pair of output terminals, and indicates whether a first plug of the first load is inserted in the first outlet, and the second signal is received from a second outlet connected to the second pair of output terminals, and indicates whether a second plug of the second load is inserted in the second outlet.

* * * * *